United States Patent

[11] 3,593,211

[72] Inventors Yasutoshi Ishizaki; Nobuyoshi Yoshida, both of Tokyo, Japan
[21] Appl. No. 745,047
[22] Filed July 15, 1968
[45] Patented July 13, 1971
[73] Assignee Nippon Electric Company, Limited Tokyo, Japan
[32] Priority July 17, 1967
[33] Japan
[31] 42/45954

[54] ADJUSTABLE ATTENUATION EQUALIZER
5 Claims, 15 Drawing Figs.

[52] U.S. Cl. .......... 333/28, 333/11
[51] Int. Cl. .......... H03h 7/22
[50] Field of Search .......... 333/28, 28 A, 28 B, 11

[56] References Cited

UNITED STATES PATENTS

| | | | |
|---|---|---|---|
| 1,836,810 | 12/1931 | Mason | 333/28 |
| 2,096,027 | 10/1937 | Bode | 333/28 |
| 2,348,572 | 5/1944 | Richardson | 333/28 |
| 2,718,622 | 9/1955 | Harkless | 333/28 |

*Primary Examiner*—Herman Karl Saalbach
*Assistant Examiner*—Marvin Nussbaum
*Attorney*—Hopgood and Calimafde

ABSTRACT: An adjustable attenuation equalizer having multiple independently adjustable loss characteristics in either distinctly separated or overlapping frequency ranges comprises two or more adjustable impedance elements in a single equalizing network. The equalizer of the invention also includes fixed impedance elements, the number of which is equal to the number of transformer networks in the equalizing network.

INVENTORS
YASUTOSHI ISHIZAKI
NOBUYOSHI YOSHIDA
BY
Hopgood & Calimafde
ATTORNEYS

INVENTORS
YASUTOSHI ISHIZAKI
NOBUYOSHI YOSHIDA
BY
Hopgood & Calimafde
ATTORNEYS

INVENTORS
YASUTOSHI ISHIZAKI
NOBUYOSHI YOSHIDA
BY
Hopgood & Calimafde
ATTORNEYS

INVENTORS
YASUTOSHI ISHIZAKI
NOBUYOSHI YOSHIDA
BY
Hopgood & Calimafde
ATTORNEYS

INVENTORS
YASUTOSHI ISHIZAKI
NOBUYOSHI YOSHIDA
BY
Hopgood & Calimafde
ATTORNEYS

ADJUSTABLE ATTENUATION EQUALIZER

DETAILED DESCRIPTION OF THE INVENTION

The present invention relates generally to attenuation equalizing networks, and more particularly to new and improved adjustable attenuation equalizers of the kind incorporating a plurality of adjustable impedance elements and accordingly which have a plurality of adjustable loss characteristics for the compensation of mainly, but not exclusively, the cumulative residual loss (or gain/frequency distortions) of an unpredicable character of long-haul transmission systems such as telephony, television, or data communication.

It is essential, as is known, in the design of adjustable attenuation equalizers, that the variation of the transfer characteristics of the equalizer from a reference loss caused by the adjustment of the adjustable impedance element be proportionally related. This proportionality is met, by various adjustable attenuation equalizing networks such as the one developed by H. W. Bode and fully explained in the U.S. Pat. No. 2,096,027 entitled 'Attenuation Equalizer.'

The essence of this patented invention resides in constructing circuit structures which may be represented by the general schematic arrangement as show in FIG. 1 which will meet the following basic relationship:

$$Z_{56}{}^2\frac{Z_{2\infty}}{Z_{20}}=Z_0{}^2 \qquad (1)$$

wherein $Z_0$, $Z_{56}$, $Z_{2\infty}$, and $Z_{20}$ denote respectively a reference normal value of the adjustable impedance, the impedance of the fixed impedance network measured at the pair of terminals 5 and 6, and the transfer impedances from the source impedance $Z_S$ to the load impedance $Z_R$ with the pair of terminals 5 and 6 open- and short-circuited.

The operating transfer characteristic of the basic schematic arrangement shown in FIG. 1 may be expressed as $A=A_o+\Delta A$ (2)

The first and the second term in the right member of equation (2) are respectively a constant and a variable term, of which $\Delta A$ may be represented, with good approximation, by $$\Delta A=R_e\left[k\cdot g(f)\cdot\frac{Z-Z_0}{Z+Z_0}\right] \qquad (3)$$

wherein $k$ is a constant, $g(f)$ is a function of frequency and $R_e$ is an operational symbol indicative of the real part of a complex quantity.

All of Bode's adjustable equalizing networks can be reduced to the general schematic arrangement shown in FIG. 1 which has a single adjustable impedance element and hence, has a single adjustable loss characteristic.

A known method of constructing an adjustable attenuation equalizer for integration into a main station repeater in a long-haul transmission system for close compensation of accumulated random gain/frequency distortions is to connect in tandem as many Bode's networks as are called for by the system.

Attenuation equalizing networks of the kind incorporating two adjustable impedance elements and provided with two independently variable characteristics similar to the adjustable attenuation equalizers of this invention, have been proposed by W. R. Lundry in his treatise entitled 'and Delay Equalizers for Coaxial Lines', AIEE Transactions, vol. 68, 1949, PP 1174—1178. It seems that there is no definite mention as to whether or not the number of adjustable impedance elements or controls may be increased to three or more according to this invention.

Granting that this is possible and at the same time, that they are workable in overlapping frequency ranges, the degree to which the maximum adjustable range of each loss characteristic of the Lundry equalizer decreases with an increasing number of controls will be much larger than would be possible with the present equalizer.

In view of this respect, the present invention may be deemed as a generalization or an extension of Bode's equalizing networks or as an improvement over the Lundry's equalizing network.

Accordingly, an object of this invention is to provide an adjustable attenuation equalizer of the kind having multiple independently adjustable loss characteristics mainly in overlapping frequency ranges so that cumulative attenuation distortions of long-haul transmission lines may be closely equalized with a lesser number of tandem connections than would be necessary if conventional equalizers ere used.

Another object of this invention is to provide such adjustable attenuation equalizers of the kind specifically adopted for the construction of cosine equalizers that have been found most useful in long-haul transmission systems.

It will be obvious by one skilled in the art that the fulfillment of these objects would be extremely advantageous in practical applications as follows: In constructing long-haul transmission lines, the number of equalizers connected in tandem to construct a mop-up equalizer in each main station repeater is much reduced as compared with conventional equalizers. An example of a practical estimation demonstrates that the following numbers of equalizers need to be connected in tandem respectively for comparable performance: Bode's equalizer 30; Lundry's equalizer 15; the present equalizer (with three adjustable loss characteristics, for example) 10. Accordingly the reduction in the number and cost of component parts of the equalizers according to this invention connected in tandem over the conventional equalizers, especially when the equalizers in tandem constitute a cosine equalizer, will be obvious.

As has been mentioned, an outstanding feature of this invention is the provision of two or more adjustable impedance elements in a single equalizing network and hence, the capability for adjusting two or more loss characteristics independently from each other in either distinctly separated or overlapping frequency ranges, as required, and further, for adjusting each of these loss characteristics in proportional relationship with reference to the normal value.

Another outstanding feature of this invention is the inclusion of fixed impedance elements, the number of which being equal to that of transformer networks in the equalizing network as will be evident from an inspection of the disclosed embodiments.

That this inclusion contributes greatly for enabling multiple adjustable loss characteristics of the equalizing network of this invention to be varied independently from one another, the proportionality of variation to be maintained for each loss characteristic, and the symmetricity of variation of the characteristic to be secured above and below the normal or reference loss, has been verified both theoretically and experimentally by the present inventors.

These and other objects and features of this invention will be more apparent from the following description taken in connection with the general schematic arrangement of the equalizing networks and a few embodiments of this invention illustrated on the accompanying drawings, in which.

Figure 1:
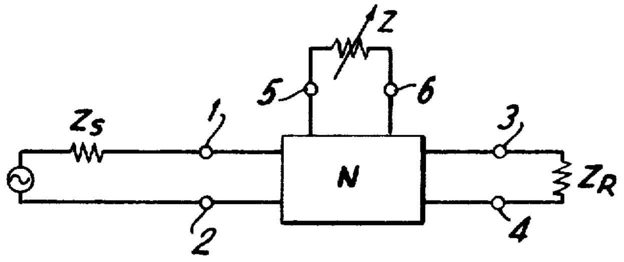
FIG. 1 shows the general schematic arrangement of the attenuation equalizing network invented by Hendrik W. Bode.
Figure 2:
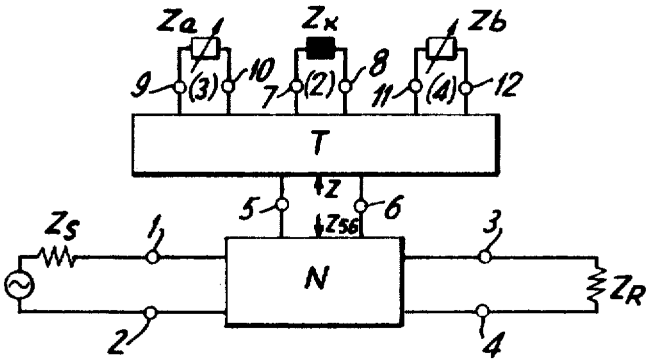
FIG. 2 shows the general schematic arrangement of an adjustable attenuation equalizing network containing two adjustable impedance elements according to this invention.
Figure 3:
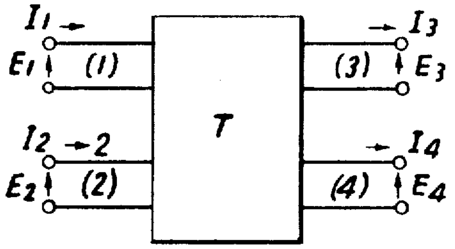
FIG. 3 is a general schematic of a four-port transformer network explanatory of the section T in the arrangement of FIG. 2.
Figure 7:
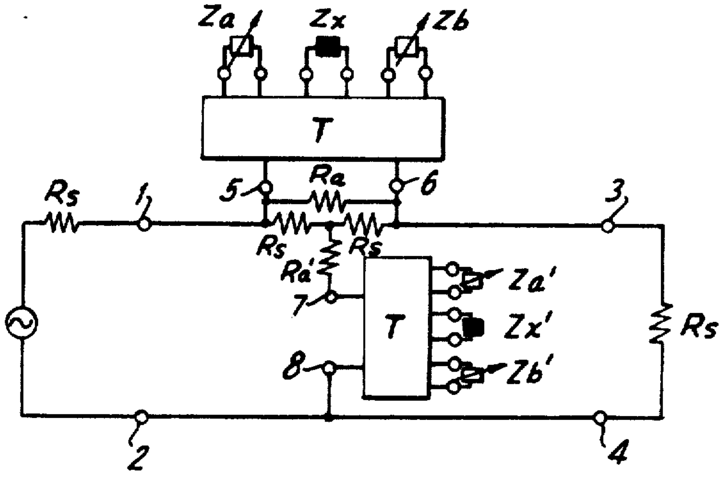
Figures 8, 10:
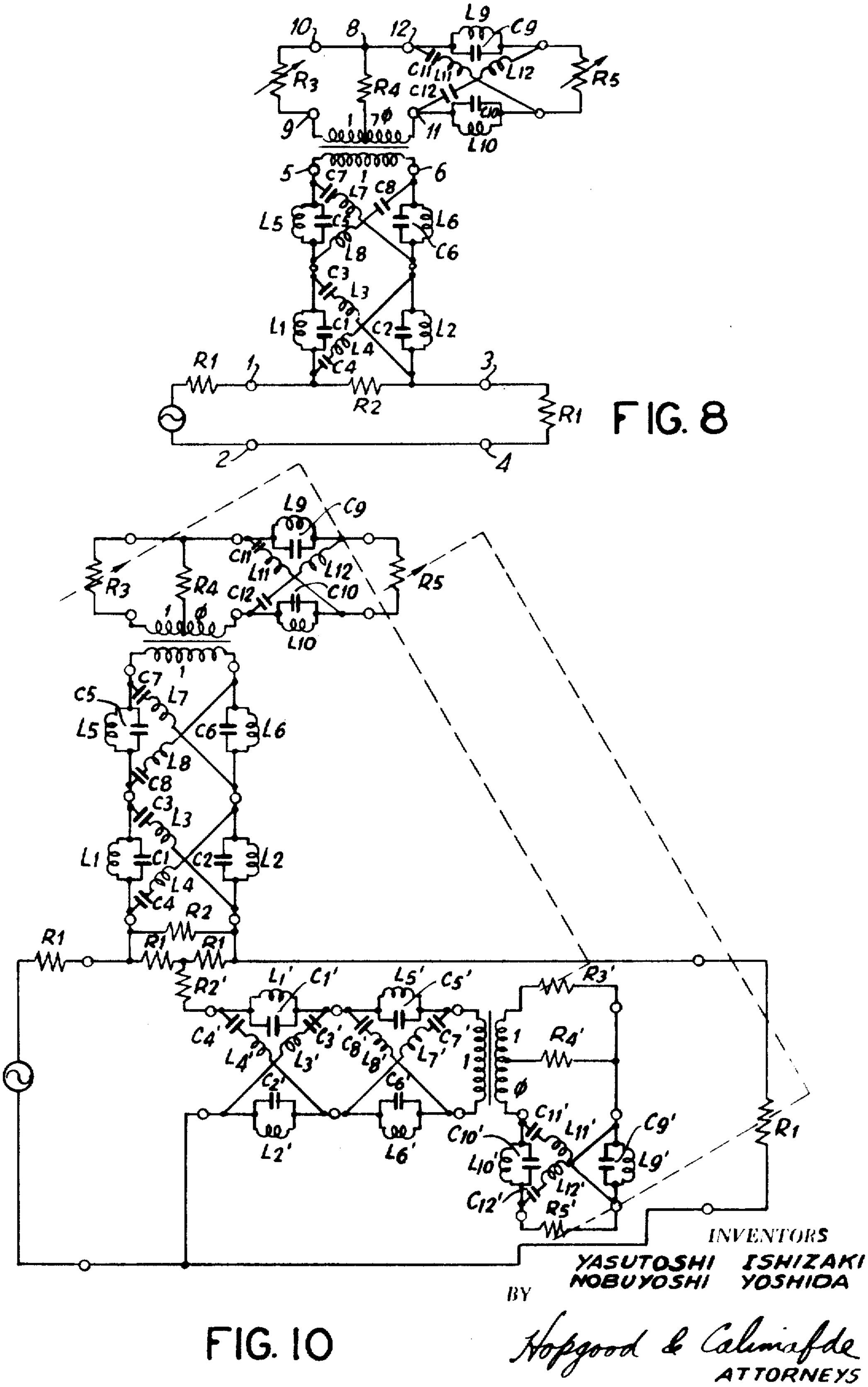
Figure 9:
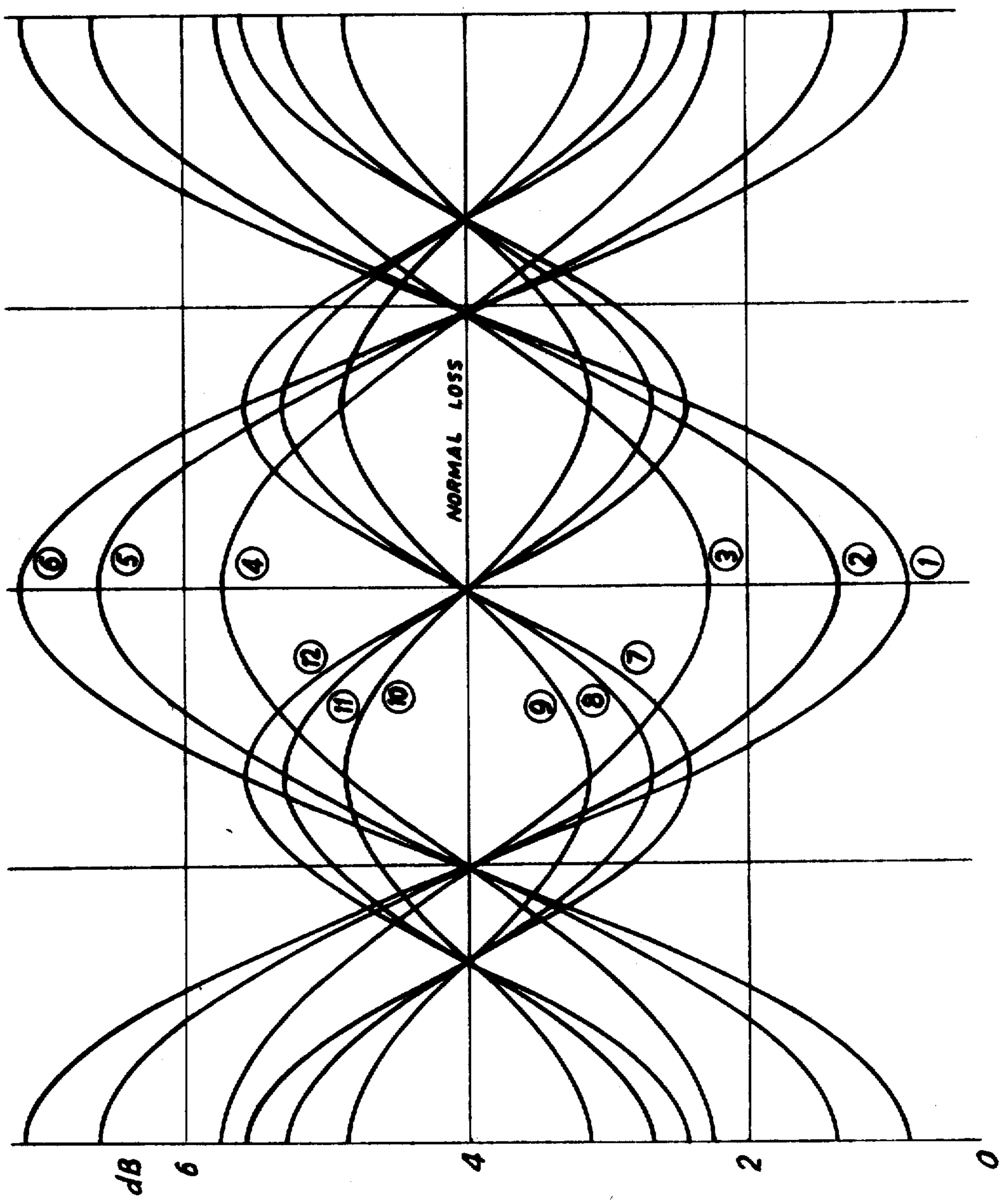

FIGS. 5 *a*, *b*, *c* and *d* show respectively four different embodiments of the four-port transformer network schematically shown in FIG. 3 as an integral element of the adjustable attenuation equalizer according to this invention;

FIGS. 6 *a*, *b* and *c* are respectively schematic diagrams illustrating three different embodiments of the adjustable impedance element;

FIG. 7 is a schematic circuit diagram of an adjustable attenuation equalizer corresponding to the one shown in FIG. 2 and in the form of a constant-impedance network;

FIG. 8 illustrates schematically the detailed design of an adjustable attenuation equalizer according to a preferred embodiment of this invention;

FIG. 9 graphically illustrates the adjustable loss characteristics of the attenuation equalizer of FIG. 8; and FIG. 10 illustrates schematically the detailed design of an adjustable attenuation equalizer according to another preferred embodiment of this invention, which corresponds to the one shown in FIG. 8, and is in the form of a constant-impedance network.

In the first place, a preliminary mathematical analysis will be made of a general adjustable equalizing network containing $n$ adjustable impedance elements.

Let the normalized values of the $n$ impedance elements with respect to their reference values be denoted respectively by $x_1, x_2, \ldots x_n$.

Then, $\Delta A$ for this network, which corresponds to $\Delta A$ in equation (3), may be expressed as $$\Delta A = k_1 \cdot g_1(f)\frac{x_1-1}{x_1+1} + k_2 \cdot g_2(f)\frac{x_2-1}{x_2+1} + k_n \cdot g_n(f) \cdot \frac{x_n-1}{x_n+1} \quad (4)$$

In equation (4), $k_1$ through $k_n$ each denote a constant and $g_1(f)$ through $g_n(f)$ each denote a function of frequency only.

To facilitate an understanding of the principles of this invention, a most simple case in which the number of adjustable impedance elements is equal to two ($n=2$) will be taken—that is, the general schematic arrangement shown in FIG. 2. Referring to FIG. 2, T represents a hybrid transformer network with four terminal pairs 5–6 (1), 7–8 (2), 9–10 (3), and 11–12 (4), while $Z_a$, $Z_b$, and $Z_x$ represent respectively two adjustable impedance elements and one fixed impedance. It will be presumed that the relationship $$Z_{s0}\frac{Z_{1\infty}}{Z_{10}} = Z_0^2$$

holds for all adjustable attenuation equalizers of this invention in the same manner as in Bode's equalizer. Referring to the general schematic arrangement of FIG. 2, it will be seen that the hybrid transformer network T is so designed that a similar relationship as equation (1) may be established between the normal value of the adjustable impedance element $Z_a$ (or $Z_b$) and all remaining networks to which impedance $Z_a$ (or $Z_b$) is connected.

Now the detail design of the four-port hybrid transformer network T shown in FIG. 2 will be analyzed with reference to a basic schematic diagram of the network T shown in FIG. 3 on the assumption that port voltages and currents are related as follows:

$$\begin{vmatrix} E_1 \\ E_2 \\ I_3 \\ I_4 \end{vmatrix} = \frac{1}{n_3} \begin{vmatrix} n_1 & n_3 & 0 & 0 \\ -n_2 & n_3 & 0 & 0 \\ 0 & 0 & n_1 & -n_2 \\ 0 & 0 & n_3 & n_3 \end{vmatrix} \begin{vmatrix} E_3 \\ E_4 \\ I_1 \\ I_2 \end{vmatrix} \quad (5)$$

wherein current and voltage polarities ill be as indicated in FIG. 3 and $n_1$, $n_2$, and $n_3$ denote respectively real numbers but zeros (that the real number represent numbers of turns of transformer windings will become evident afterwards).

Then, when terminal pairs 9–10 (3) and 11–12 (4) are respectively terminated with variable impedance elements $Z_a$ and $Z_b$, the impedance matrix of the two-port network with terminal pairs 5–6 (1) and 7–8 (2) is given by $$Z = \begin{vmatrix} \frac{n_1^2}{n_3^2}Z_a + Z_b & \frac{-n_1 n_2}{n_3^2}Z_a + Z_b \\ \frac{-n_1 n_2}{n_3^2}Z_a + Z_b & \frac{n_2^2}{n_3^2}Z_a + Z_b \end{vmatrix} \quad (6)$$

To eliminate $n_3$ from equation (6), suppose a transformer having a turn ratio $n_1 + n_2/n_3$ is connected between impedance $Z_a$ and T and across terminals 9 and 10. Then $n_3$ may be taken as $$n_3 = n_1 + n_2 \quad (7)$$

substituting the relation $$\Phi = n_2/n_1 \quad (8)$$

into equation (6) yields $$Z = \begin{vmatrix} \frac{Z_a}{(1+\phi)^2} + Z_b & -\frac{\phi Z_a}{(1+\phi)^2} + Z_b \\ -\frac{\phi Z_a}{(1+\phi)^2} + Z_b & \frac{\phi^2 Z_a}{(1+\phi)^2} + Z_b \end{vmatrix} \quad (9)$$

Therefore the impedance $Z_{in}$ of the two-port network T at terminal pair 5–6 (1 with the fixed impedance $Z_x$ connected to terminal pair 7–8 (2) may be expressed as $$Z_{in} = \frac{\left[\frac{Z_a}{(1+\phi)_2} + Z_b\right] Z_x + Z_a Z_b}{Z_x + \frac{\phi^2 Z_a}{(1+\phi)^2} + Z_b} \quad (10)$$

suppose the value of $Z_x$ is selected equal to $n_2/n_1$ times the value of $Z_o$ (which is the normal value of $Z_{in}$)—that is, $$Z_x = \Phi Z_o \quad (11)$$

By substituting (11) into (10), an equation corresponding to $(Z-Z_o)/Z+Z_o)$ in (3) for Bode's equalizing network may be obtained as follows:

$$\frac{Z_{in}-Z_0}{Z_{in}+Z_0} = \frac{1}{1+\phi} \cdot \frac{Z_a-(1+\phi)Z_0}{Z_a+(1+\phi)Z_0} + \frac{\phi}{1+\phi} \cdot \frac{Z_b - \frac{\phi}{1+\phi}Z_0}{Z_b + \frac{\phi}{1+\phi}Z_0} \quad (12)$$

As will be seen from equation (12) the fixed impedance $Z_x$ given by equation (11) is to provide symmetricity for each of the loss characteristics with respect to its normal value.

Therefore the adjustable loss characteristics of the circuit arrangement shown in FIG. 2 are given by $$\Delta A(f) = R_e\left[K\frac{1}{1+\phi}\frac{Z_a-(1+\phi)Z_0}{Z_a+(1+\phi)Z_0}\right] + R_e\left[K\frac{\phi}{1+\phi}\frac{Z_b - \frac{\phi}{1+\phi}Z_0}{Z_b + \frac{\phi}{1+\phi}Z_0}\right] \quad (13)$$

where $K$ denotes a constant determined by the network N, and $R_e$ signifies a symbol representing the real part of a complex quantity. It will be apparent from equation (13) in view of equation (4) that the two adjustable loss characteristics are represented by the first and second terms respectively in the right-hand side of equation (13) and that these characteristics are independently variable from each other. An example of the variable impedance $Z_a$ in equation (13) is shown in FIG. 6a.

Figure 6A:

In FIG. 6a, one end of a constant-impedance network with two terminal pairs, whose characteristic impedance is $(1+\Phi) Z_o$, is terminated with a variable impedance $Z_T$. The impedance $Z_a$ looking into the network at the opposing terminal pair is thus expressed as:

$$Z_a = (1+\Phi)Z_o \tanh(\sigma_a + \Phi_a(s)), \quad s=jw \quad (14)$$

$$\sigma_a = \tanh^{-1}\frac{Z_T}{(1+\phi)Z_0} \quad (15)$$

Where $\theta_a(s)$ is the propagation constant of this network, $j$ is an imaginary unit, $w$ is an angular frequency, and $\sigma_a$ is the position angle.

Since impedances $Z_a$ and $Z_T$ are resistors, $\sigma_a$ is a real value. Thus, the impedance $Z_a$ is varied by changing the impedance value of $Z_T$ and keeping $\theta_a$ constant.

Figure 6B:
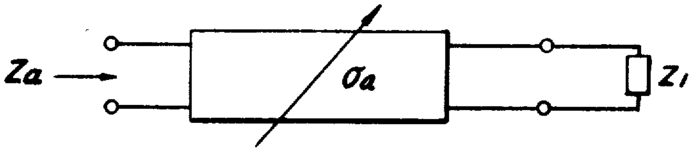

Another conventional construction of impedance $Z_a$ as illustrated in FIG. 6b, wherein one end of a constant-impedance network (consisting of purely resistive impedance elements)

with a characteristic impedance $(1+\Phi)Z_o$ is terminated with a fixed impedance $Z_1$ given by the following equation. The propagation constant of this network is selected to $\sigma_a$. Then the impedance $Z_a$ looking into at the opposing terminal pair and the fixed impedance $Z_1$ are expressed as $$Z_a=(1+\Phi)Z_o\tanh(\sigma_a+\theta_a(s)) \quad (14')$$

$$Z_1=(1+\Phi)Z_o\tanh\theta_a(s) \quad \text{TM}(16)$$

Figure 6C:
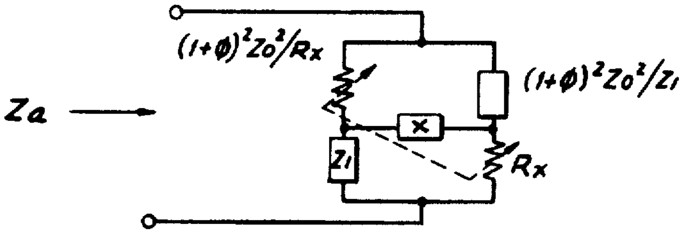

Still another conventional example of $Z_a$ is illustrated in FIG. 6c, where two fixed impedances $Z_1$ and $(1+\Phi)^2Z_o^2/Z_1$, which are in a reciprocal impedance relationship with respect to the characteristic impedance $(1+\Phi)Z_o$, and two variable impedances $R_x$ and $(1+\Phi)^2Z_1^2/R_x$, which are in a reciprocal impedance relationship with respect to $(1+\Phi)Z_o$, are constituted as a bridge with four arms. In this case, $Z_a$ is expressed as $$Z_a=(1+\Phi)Z_o\coth(\sigma_a+\theta_a(s)) \quad (14'')$$

$$\sigma_a=\frac{R_x}{(1+\phi)Z_0}\cdot\theta_a(s)=\frac{Z_1}{(1+\phi)Z_0}$$

Since this bridge is balanced, the value of $Z_a$ is unaffected if an arbitrarily chosen impedance X is connected in a diagonal branch as illustrated.

The variable impedance $Z_b$ is constructed in like manner, and given by the following equation: $Z_b=(\Phi/1+\Phi)Z_o\tanh(\sigma b+\theta_b(s))$ (17)

From equations (13), (14) and (17, it follows:

$$A(f)=R_e\left[k\left\{\frac{1}{1+\phi}\cdot\frac{1-\tanh\theta_a}{1+\tanh\theta_a}\cdot\frac{\tanh\sigma_a-1}{\tanh\sigma_a+1}+\frac{\phi}{1+\phi}\cdot\frac{1-\tanh\theta_b}{1+\tanh\theta_b}\cdot\frac{\tanh\sigma_a-1}{\tanh\sigma_a+1}\right\}\right] \quad (18)$$

Assuming that $$g_1(f)=R_e\left[\frac{1-\tanh\theta_a}{1+\tanh\theta_a}\right]$$

$$g_2(f)=R_e\left[\frac{1-\tanh\theta_b}{1+\tanh\theta_b}\right] \quad (19)$$

$$x_1=\tanh\sigma_a$$

$$x_2=\tanh\sigma_b$$

then, from Equation 18, it follows $$A(f)=k\cdot\frac{1}{1+\phi}\cdot g_1(f)\cdot\frac{x_1-1}{x_1+1}+k\cdot\frac{\phi}{1+\phi}\cdot g_2(f)\cdot\frac{x_2-1}{x_2+1} \quad (20)$$

Since $\theta_a$ and $\theta_b$ are functions of frequency, and $\sigma_a$ and $\sigma_b$ are real values, $g_1(f)$ and $g_2(f)$ are functions of frequency, and $x_1$ and $x_2$ are real values independent of frequency. It is apparent from equations (20) and (4) that the above-mentioned equalizer meets the desired requirement.

Referring to FIG. 3, terminal pair (1)-(2) or (3)-(4) is called particular terminal sets.

In the above-mentioned case, the terminal pairs (2), (3), and (4) of the network T in FIG. 3 are respectively terminated with the impedances $Z_x$, $Z_a$ and $Z_b$, and $Z_{in}$ is expressed by equation (20). Whereas, the same equation is obtained when the terminal pairs (1), (2), and (3) of the network T are respectively connected with the impedance $Z_a$, $Z_b$ and $Z_x$, if the characteristic impedances of the terminal pairs (1), (2) and (3) are set to $(1+\Phi)Z_o$, $\frac{\phi}{1+\phi}Z_0$ and $\phi Z_0$ respectively.

While a description has been made of the circuit arrangement of FIG. 2 containing two adjustable impedance elements ($n=2$), the number of elements may be increased by connecting the variable impedance $Z_{in}$ expressed by equation (10) to a terminal pair of another transformer network T' instead of to impedance $Z_a$ or $Z_b$.

From equations (14), (15), and (10), it follows:

$$Z_{in}=\frac{1+\frac{1}{1+\phi}\frac{\tanh(\sigma a_i+\theta a_i(s))-1}{\tanh(\sigma a_i+\theta a_i(s))+1}}{1-\frac{1}{1+\phi}\frac{\tanh(\sigma a_i+\theta a_i(s))-1}{\tanh(\sigma a_i+\theta a_i(s))+1}}$$

$$+\frac{\phi}{1+\phi}\frac{\tanh(\sigma b_i+\theta b_i(s))-1}{\tanh(\sigma b_i+\theta b_i(s))+1}$$

$$+\frac{\phi 1}{1+\phi}\frac{\tanh(\sigma a_i+\theta b_i(s))-1}{\tanh(\sigma b_i+\theta b_i(s))+1} \quad (21)$$

A two-terminal impedance given by equation (17) may be regarded as a new variable impedance. By replacing the original variable impedances $Z_a$ and/or $Z_b$ with such new variable impedance or impedances, the number of which is determined by the design requirements, it will be seen that adjustable attenuation equalizers for $\geqq 3$ can be realized.

Figure 4:
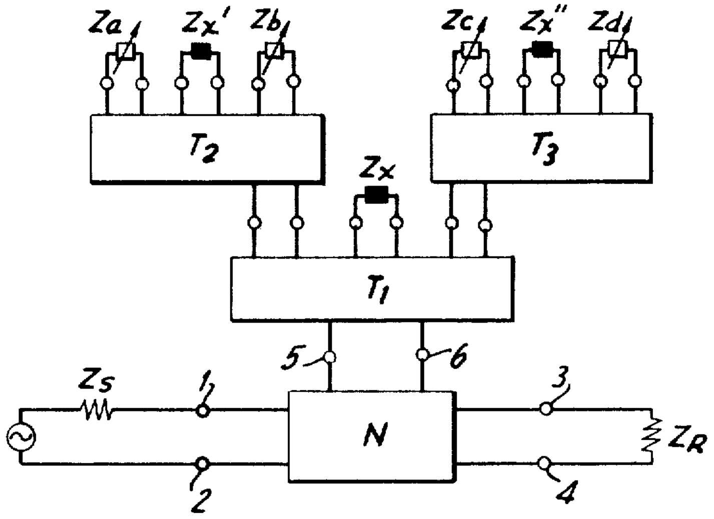
FIG. 4 is the general schematic arrangement of the adjustable attenuation equalizer of this invention, comprising four adjustable impedance elements and therefore, provided with four adjustable loss characteristics.

FIG. 4 shows the basic schematic arrangement for $n=4$, wherein $Z_a$, $Z_b$, $Z_c$, and $Z_d$ are the four variable impedance elements and $Z_x$, $Z_x'$, and $Z_x''$ are fixed impedances for defining the symmetricity of the four adjustable loss characteristics of this equalizer with reference to the respective normal losses.

With the circuit arrangement of FIG. 4, a similar relationship as equation (1) should exist between the normal value of any adjustable impedance element and the remaining network with all other impedances fixed to the normal values, while the fixed impedances $Z_x$, $Z_x'$, and $Z_x''$ may be designed using equation (11) and similar equations. The network of FIG. 4 may be realized by replacing impedances $Z_a$ and $Z_b$ in FIG. 2 respectively with two hybrid transformers having two impedances $Z_a$, $Z_b$, and $Z_c$, $Z_d$, respectively. In such a manner, by replacing some or all of the adjustable impedance elements with hybrid transformers (as if the came out as so many branches from these elements), an adjustable attenuation equalizer with more numerous controls may be constructed. With such a circuit structure, a similar equation as equation (1) will be established between any control and the remaining network, while impedance $Z_x$ connected to any hybrid transformer may be designed by use of a similar equation as equation (11).

An adjustable attenuation equalizer according to this invention may be considered to consist of one fixed impedance network and an assembly of hybrid transformer networks arranged in multiple stages and branches. (The number of stages (N) may be defined as the maximum number of transformers contained in a route from an adjustable impedance element to the fixed impedance network, while the number of branches may be defined as how many adjustable impedance elements have been replaced with the transformer networks in realizing the equalizer with respect to the general schematic of FIG. 2. (Incidentally, the number of stages and branches for the schematic circuit arrangements of FIGS. 2 and 4 are respectively 1 and o; 2 and 2.)

As will be evident from equation (16), when $\Phi=1$—that is, when the maximum adjustable ranges of the two adjustable loss characteristics are the same, the range is reduced to one-half of the original value each time the number of stages N is increased by one. This may be expressed as maximum adjustable range $=(0.5)^N$.

With the Lundry equalizing networks, the corresponding rate of decrease may be approximately expressed as $(0.25)^N$. Therefore, whereas the upper limit of the stage number is three or four (at most) according to this invention, it would be appreciably difficult to take even three for the upper limit of the Lundry equalizers for a practical application.

Now a detailed description will be made of the four-port hybrid network shown in FIG. 3 whose currents and voltages are given by equation (5).

Figure 5A:
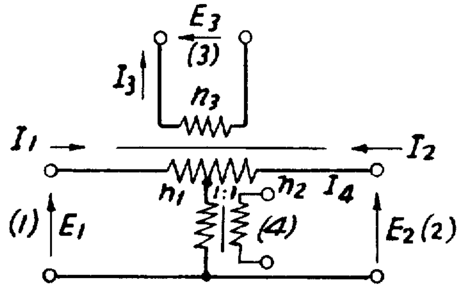

Several embodiments of the hybrid transformer network are typically illustrated in FIGS. 5 *a—d*, of which FIG. 5*a* is one composed of what has been called a hybrid transformer.

The port currents and voltages of this hybrid transformer meet equation (5, where $n_1$, $n_2$, and $n_3$ represent the number of turns of the three windings of the hybrid transformer.

Figure 5B:
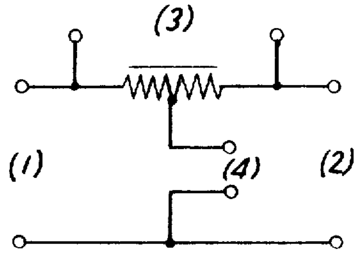

FIG. 5*b* shows an embodiment composed of an autotransformer, and

Figure 5C:
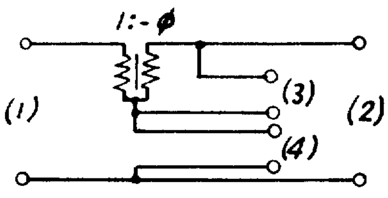

FIG. 5*c* shows one composed of a circuit commonly called the Riegger circuit.

Figure 5D:
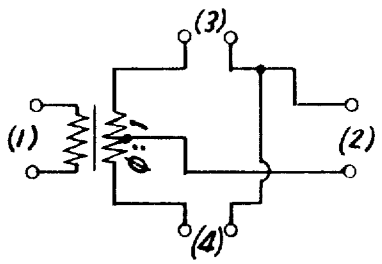

FIG. 5*d* shows an embodiment composed of a circuit commonly called the Jaumann circuit. In any of these embodiments, (1)-(2) and (3)-(4) each denote the two sets of terminal pairs. Any of the circuits illustrated in FIGS. 5*b*—*d* are equivalent in function to the circuit of FIG. 5*a*.

The present invention can also find application in the design of constant-impedance type adjustable attenuation equalizers of the kind with two or more loss characteristics. FIG. 7 illustrates an example of a constant-impedance equalizer network with two adjustable loss characteristics. With this arrangement, the relationship between impedances $Z_o$, $R_a$, and $R_b$ corresponding to equation (1) should be expressed as $$Z_0^2\left(1+\frac{R_a}{R_b}\right)=R_a^2 \qquad (23)$$

Because FIG. 7 is a constant-impedance network, the following conditions should exist:

| | |
|---|---|
| $R_a R_a'=R_i^2$ | |
| $Z_a Z_a'=R_i^2$ | (24) |
| $Z_b Z_b'=R_i^2$ | (25) |
| $Z_x Z_x'=R_i^2$ | (26) |
| | (27) |

Then the circuit arrangement of FIG. 7 should have the same function as that of the network of FIG. 2.

The detailed design of an adjustable attenuation equalizer as a preferred embodiment of this invention is illustrated in FIG. 8. This network illustrates a part of a cosine equalizer corresponding to the second and third terms of the adjustable loss characteristic which may be represented by a Fourier cosine series.

In the conventional design for an equivalent function, two equalizers, one for varying the second term and the other for varying the third term, would be connected in cascade and the number of all-pass networks associated with the equalizers would require five in all —that is, two for the second term and three for the third term, whereas the number is lessened to three in all with this embodiment, because two out of the three all-pass networks have been shared between the two terms, resulting in a reduction in the number of all-pass networks.

This will be evident from the following description in connection with FIG. 8 which corresponds to the general schematic of FIG. 2 (see same terminal pair numerals) and in which the variable impedance connected to terminal pair 11 and 12 is in the form of the circuit shown in FIG. 6*a*.

By adjusting the variable resistances $R_3$ and $R_5$ the loss characteristics corresponding to the second and third terms can be varied independently from each other. Assume that the circuit elements in this network are designed as follows:

$R_1$=75 Ω
$R_2$=226.785 Ω
$R_4$=71.545 Ω
$\Phi=n_2/n_1=0.5$
$L_1=L_2=L_5=L_6$=4.554 μh.
$L_3=L_4=L_7=L_8$=1.518 μh.
$L_9=L_{10}$=3.416 μh.
$L_{11}=L_{12}$=1.138 μh.
$C_1=C_2=C_5=C_6$= 74.15 pf.
$C_3=C_4=C_7=C_8$=222.45 pf.
$C_9=C_{10}$=98.86 pf.
$C_{11}=C_{12}$= 296.60 pf.
Normal values of $R_3$ and $R_5$ =
$R_3$=214.637 Ω
$R_5$=107.318 Ω

Then, the normal loss (in this case, normal flat setting loss) of this equalizing network becomes 4 db. (See FIG. 9)

FIG. 9 is also a plot of the adjustable loss characteristics of this equalizing network when variable impedances $R_3$ and $R_5$ are varied as follows: (Note: Numerals in circles correspond to those in FIG. 9)

| | | |
|---|---|---|
| ① | $R_3$=858.548 Ω | $R_5$=107.318 Ω |
| ② | $R_3$=641.911 Ω | $R_5$=107.318 Ω |
| ③ | $R_3$=429.274 Ω | $R_5$=107.318 Ω |
| ④ | $R_3$=107.318 Ω | $R_5$=107.318 Ω |
| ⑤ | $R_3$=71.545 Ω | $R_5$=107.318 Ω |
| ⑥ | $R_3$=53.659 Ω | $R_5$=107.318 Ω |
| ⑦ | $R_3$=214.637 Ω | $R_5$=429.272 Ω |
| ⑧ | $R_3$=214.637 Ω | $R_5$=321.954 Ω |
| ⑨ | $R_3$=214.637 Ω | $R_5$=214.637 Ω |
| ⑩ | $R_3$=214.637 Ω | $R_5$=53.659 Ω |
| ⑪ | $R_3$=214.637 Ω | $R_5$=35.772 Ω |
| ⑫ | $R_3$=214.637 Ω | $R_5$=26.829 Ω |

FIG. 10 illustrates the detailed design of a constant-impedance type adjustable attenuation equalizer as another preferred embodiment of this invention. Although the normal loss and other characteristics of this network make no difference from the previous embodiment, the various circuit elements contained in the network must be designed as follows:

| | |
|---|---|
| $R_1$=75 Ω | |
| $R_2$=113.392 Ω | $R_2'$=49.606 Ω |
| $R_4$=35.772 Ω | $R_4'$=39.310 Ω |
| Φ=0.5 | |
| $L_1=L_2=L_5=L_6$=2.277 μh., | $L_1'=L_2'=L_5'=L_6'$=2.502 μh. |
| $L_3=L_4=L_7=L_8$=0.759 μh., | $L_3'=L_4'=L_7'=L_8'$=0.834 μh. |
| $C_1=C_2=C_5=C_6$= 148.30 pf. | $C_1'=C_2'=C_5'=C_6'$=134.95 μh. |
| $C_3=C_4=C_7=C_8$= 444.90 ph. | $C_3'=C_4'=C_7'=C_8'$=404.86 pf. |
| $L_9=L_{10}$=1.708 μh. | $L_9'=L_{10}'$=3.336 μh. |
| $C_9=C_{10}$= 197.73 pf. | $C_9'=C_{10}'$= 101.21 ph. |
| $L_{11}=L_{12}$=0.569 μh. | $L_{11}'=L_{12}'$=1.112 μh. |
| $C_{11}=C_{12}$= 593.20 ph. | $C_{11}'=C_{12}'$=303.64 pf. |

In this case, the normal values of the variable resistances will be designed as follows:

| | |
|---|---|
| $R_3$=107.318 Ω | $R_3'$=52.414 Ω |
| $R_5$=53.659 Ω | $R_5'$=104.828 Ω |

FIG. 9 also illustrates a plot of the adjustable loss characteristics of this constant-impedance equalizing network when variable resistances $R_3$ and $R_3'$, $R_5$ and $R_5'$ are varied as follows: (Note: Numerals in circles correspond to those in FIG. 9.)

| | | |
|---|---|---|
| ① | $R_3$=429.272 Ω | $R_5$=53.659 Ω |
| | $R_3'$=13.103 Ω | $R_5'$=104.828 Ω |
| ② | $R_3$=321.954 Ω | $R_5$=153.659 Ω |
| | $R_3'$=17.471 Ω | $R_5'$=104.828 Ω |
| ③ | $R_3$=214.636 Ω | $R_5$=53.659 Ω |
| | $R_3'$=26.207 | $R_5'$=104.828 Ω |
| ④ | $R_3$=53.659 Ω | $R_5$=53.659 Ω |
| | $R_3'$=104.828 Ω | $R_5'$=104.828 Ω |
| ⑤ | $R_3$=35.772 Ω | $R_5$=53.659 Ω |
| | $R_3'$=157.242 Ω | $R_5'$=104.828 Ω |
| ⑥ | $R_3$=26.829 Ω | $R_5$=53.659 Ω |
| | $R_3'$=209.656 Ω | $R_5'$=104.828 Ω |
| ⑦ | $R_3$=107.318 Ω | $R_5$=214.636 Ω |
| | $R_3'$=52.414 Ω | $R_5'$=26.207 Ω |
| ⑧ | $R_3$=107.318 Ω | $R_5$=160.977 Ω |
| | $R_3'$=52.414 Ω | $R_5'$=34.942 Ω |
| ⑨ | $R_3$=107.318 Ω | $R_5$=107.318 Ω |
| | $R_3'$=52.414 Ω | $R_5'$=52.414 Ω |
| ⑩ | $R_3$=107.318 Ω | $R_5$=209.656 Ω |
| | $R_3'$=52.414 Ω | $R_5'$=26.829 Ω |
| ⑪ | $R_3$=107.318 Ω | $R_5$=314.484 Ω |
| | $R_3'$=52.414 Ω | $R_5'$=17.886 Ω |
| ⑫ | $R_3$=107.318 Ω | $R_5$=419.312 Ω |
| | $R_3'$=52.414 Ω | $R_5'$=13.414 Ω |

As has been fully described, an adjustable attenuation equalizer according to this invention is featured by the provision of multiple loss characteristics which are independently variable from one another in either distinctly separated or overlapping frequency ranges (though the latter is the prime application intended by this invention), and a lesser number of individual equalizers in tandem than would be required if conventional equalizers were connected in tandem for obtaining a required number of adjustable loss characteristics, which, in turn, reduces the number of component parts, because a part of an auxiliary network (a part of all-pass network in case of *a* cosine equalizer) for determining the shape of the individual adjustable loss characteristics can be shared with the multiplicity of adjustable loss characteristics.

While the principles of this invention have been illustrated and described above in connection with two preferred embodiments which may be reduced to the basic schematics shown in FIGS. 2 and 7, it is to be clearly understood that there could be many other embodiments which have not yet been reduced to experimental models as well as modifications thereof, subject to the previously mentioned limitation in the number of hybrid transformer stages and that the scope of this invention.

We claim:

1. An adjustable attenuation equalizer provided with two mutually independently adjustable loss characteristics for the compensation of principally the cumulative residual loss of long-haul transmission lines comprising: a fixed impedance network having three pairs of terminals, a source impedance connected to one of said three pairs of said terminals, a load impedance connected to a second pair of said terminals, and an adjustable impedance connected to the third pair of said terminals, said fixed impedance network and said source and load impedance being proportioned in accordance with the relationship $$Z_0^2\left(1+\frac{R_a}{R_s}\right)=R_a^2$$

wherein $Z_0$, $Z_{56}$, $Z_{2\infty}$, and $Z_{20}$ denote respectively a reference normal value of said adjustable impedance, the impedance of said fixed impedance network measured at said third pair of terminals, and the transfer impedances from said source impedance to said load impedance with said third pair of terminals open- and short-circuited, and a four-port hybrid transformer network having four terminal pairs, said adjustable impedance being an impedance looking into said four-port hybrid transformer network, first and second adjustable impedance elements respectively connected to two of said terminal pairs, and a fixed impedance element $Z_x$ connected to one of the other said terminal pairs, the impedance value of said fixed impedance element $Z_x$ being determined in accordance with the relationship $$Z_x=kZ_0$$

wherein *k* denotes a constant equal to the ratio of the maximum adjustable ranges of said two mutually independently adjustable loss characteristics of the adjustable attenuation equalizer, and said two adjustable impedance elements being expressed in the form of the reference normal value of said adjustable impedance element multiplied by the hyperbolic tangent or cotangent of a term for defining the adjustable range of the corresponding loss characteristic plus a term for defining the shape of the same loss characteristic.

2. An adjustable attenuation equalizer provided with three or more mutually independently adjustable loss characteristics for the compensation of principally the residual loss of long-haul transmission lines comprising: a fixed impedance network having three pairs of terminals, a source impedance connected to one of said three pairs of terminals, a load impedance connected to a second pair of said terminals, and an adjustable impedance connected to the third pair of said terminals, an assembly of four-port hybrid transformer networks, each with two adjustable impedances and a fixed impedance, arranged in multiple stages and in multiple branches as said adjustable impedance connected to said third pair of terminals, said fixed impedance network and said source and load impedances being proportioned according to the relationship $$(Z_{56})^2\cdot\frac{Z_{2\infty}}{Z_{20}}=Z_0^2$$

wherein $Z_0$, $Z_{56}$, $Z_2$ , and $Z_{20}$ denotes respectively a reference normal value of said adjustable impedance, the impedance of said fixed impedance network measured at said third pair of terminals, and the transfer impedances from said source impedance to said load impedance with said third pair of terminals open- and short-circuited, the impedance value of a fixed impedance element $Z_{xi}$ connected to each hybrid transformer network $T_i$ being determined in accordance with the relationship $$Z_{xi}=k_i Z_{oi}$$

wherein $k_i$ denotes a constant equal to the ratio of the maximum adjustable ranges of two adjustable loss characteristics to be controlled by two adjustable impedances connected to the hybrid transformer network $t_i$, each of said two adjustable impedance elements being expressed in the form of the reference normal value of said adjustable impedance element multiplied by the hyperbolic tangent or cotangent of a term for defining the adjustable range of the corresponding loss characteristic plus a term for defining the shape of the same loss characteristic.

3. The adjustable attenuation equalizer according to claim 1 which constitutes a constant-impedance network in the form of a bridge network consisting of two pairs of adjacent arms containing respectively source impedance $R_s$, load impedance $R_s$, and two impedances $R_s'$s, a diagonal branch containing an impedance $R_a$ and an adjustable impedance connected in shunt therewith, said adjustable impedance being one looking into the hybrid transformer network or the assembly of said hybrid transformer networks and the other diagonal branch containing an impedance $R_a'$ and an adjustable impedance connected in series therewith, said two adjustable impedances being reciprocal impedances with respect to $R_s$, and $Z_0$, or a reference normal value of said adjustable impedance, $R_a$, and $R_s$ being proportioned in accordance with the relationship $$Z_o^2(1+(R_a/R_s)=R_a^2.$$

4. The adjustable attenuation equalizer according to claim 2 which constitutes a constant-impedance network in the form of a bridge network consisting of two pairs of adjacent arms containing respectively source impedance $R_s$, load impedance $R_s$, and two impedances $R_s'$s, a diagonal branch containing an impedance $R_a$ and an adjustable impedance connected in shunt therewith, said adjustable impedance being one looking into the nybrid transformer network or the assembly of said hybrid transformer networks and the other diagonal branch containing an impedance $R_a'$ and an adjustable impedance connected in series therewith, said two adjustable impedances being reciprocal impedances with respect to $R_s$, and $Z_o$, or a reference normal value of said adjustable impedance, $R_a$, and $R_s$ being proportioned in accordance with the relationship $$(Z_{56})^2\frac{Z_{2\infty}}{Z_{20}}=Z_0^2$$

5. A composite attenuation equalizer for compensating the loss characteristics of a transmission line, said equalizer comprising at least one variable impedance element having a transformer network with a first terminal set consisting of first and second terminal pairs of characteristic impedances $(1+\Phi)Z_o$ and $$\frac{\phi}{1+\phi}Z_0$$

respectively (where $\Phi$ is a real positive value, and $Z_o$ is the characteristic impedance of said attenuation equalizer), and a second terminal set consisting of a third terminal pair of characteristic impedance $\Phi Z_o$ and a fourth terminal pair; a first variable impedance element with an impedance expressed by $(1\Phi)\,Z_o\tanh(\alpha+\beta)$ (where $\alpha$ is a position angle of said first terminal pair, and $\beta$ is a function of frequency only) for terminating said first terminal pair; a second variable impedance element with an impedance expressed by $$\frac{\phi}{1+\phi}Z_0\tanh(\alpha'+\beta')$$

(where $\alpha'$ is a position angle of said second terminal pair, and $\beta'$ is a function of frequency only) for terminating said second terminal pair; and a third fixed impedance element with an impedance $\Phi Z_0$ for terminating said third terminal pair; whereby the input impedance of said fourth terminal pair serves as the variable impedance of said variable impedance element.

UNITED STATES PATENT OFFICE
CERTIFICATE OF CORRECTION

Patent No. 3,593,211 Dated July 13, 1971

Inventor(s) Yasutoshi Ishizaki, et al

It is certified that error appears in the above-identified patent and that said Letters Patent are hereby corrected as shown below:

Column 9, line 35, the formula should appear as shown below:

$$-- \left(Z_{56}\right)^2 \frac{Z_{2\infty}}{Z_{20}} = Z_0^2 --$$

Column 10, line 15, "$t_i$" should be -- $T_i$ --; line 55, the formula should appear as shown below:

$$-- Z_0^2 \left(1 + \frac{R_a}{R_s}\right) = R_a^2 --$$

Column 10, line 70, "(1Ø)" should be -- (1+Ø) -- .

Signed and sealed this 24th day of October 1972.

(SEAL)
Attest:

EDWARD M.FLETCHER,JR.
Attesting Officer

ROBERT GOTTSCHALK
Commissioner of Patents